(12) United States Patent
Partlo et al.

(10) Patent No.: US 7,522,650 B2
(45) Date of Patent: Apr. 21, 2009

(54) GAS DISCHARGE LASER CHAMBER IMPROVEMENTS

(75) Inventors: William N. Partlo, Poway, CA (US); Yoshiho Amada, San Diego, CA (US); James A. Carmichael, Valley Center, CA (US); Timothy S. Dyer, Oceanside, CA (US); Walter D. Gillespie, Poway, CA (US); Bryan G. Moosman, San Marcos, CA (US); Richard G. Morton, San Diego, CA (US); Curtis L. Rettig, Vista, CA (US); Brian D. Strate, San Diego, CA (US); Thomas D. Steiger, San Diego, CA (US); Fedor Trintchouk, San Diego, CA (US); Richard C. Ujazdowski, Poway, CA (US)

(73) Assignee: Cymer, Inc., San Diego, CA (US)

( * ) Notice: Subject to any disclaimer, the term of this patent is extended or adjusted under 35 U.S.C. 154(b) by 545 days.

(21) Appl. No.: 10/815,387

(22) Filed: Mar. 31, 2004

(65) Prior Publication Data

US 2005/0226301 A1   Oct. 13, 2005

(51) Int. Cl.
H01S 3/22 (2006.01)

(52) U.S. Cl. .............................. 372/59; 372/55; 372/58

(58) Field of Classification Search ................... 372/59, 372/58

See application file for complete search history.

(56) References Cited

U.S. PATENT DOCUMENTS 5,018,161 A    5/1991    Akins et al.

(Continued)

FOREIGN PATENT DOCUMENTS

DE         20218254 U1     2/2003

(Continued)

Primary Examiner—Dung T Nguyen

(57) ABSTRACT

A method and apparatus if disclosed which may comprise a high power high repetition rate gas discharge laser UV light source which may comprise: a gas discharge chamber comprising an interior wall comprising a vertical wall and an adjacent bottom wall; a gas circulation fan creating a gas flow path adjacent the interior vertical wall and the adjacent bottom wall; an in-chamber dust trap positioned a region of low gas flow, which may be along an interior wall and may comprise at least one meshed screen, e.g., a plurality of meshed screens, which may comprise at least two different gauge meshed screens. The dust trap may extend along the bottom interior wall of the chamber and/or a vertical portion of the interior wall. The dust trap may comprise a first meshed screen having a first gauge; a second meshed screen having a second gauge smaller than the first gauge; and the second meshed screen intermediate the first meshed screen and the interior wall. The chamber may comprise a plurality of dust collecting recesses in at least one of the vertical interior wall and the bottom wall of the chamber which may be selected from a group comprising a one-part recess and a multi-part recess, which may comprise two sections angled with respect to each other. The dust trap may comprise a pressure trap positioned between a portion of a main insulator and an interior wall of the chamber. The chamber may comprise a gas circulating fan comprising a cross-flow fan with a fan cutoff that may comprise a vortex control pocket. The chamber may comprise a preionization mechanism comprising a preionization tub containing a ground rod within an elongated opening in the preionization tube that may comprise a compliant member, an automatic preionization shut-off mechanism, a preionization onset control mechanism and/or a focusing element. The chamber may comprise an elongated baffle plate that may comprise a plurality of pyramidal structures including varying numbers of generally pyramidal elements and oriented in groups of varying numbers of generally pyramidal elements and oriented along and transverse to the longitudinal axis. Acoustic resonances within the chamber may also be reduced by introducing an artificial jitter into the timing of the laser discharges varying the inter-pulse period randomly or in a repeating pattern from pulse to pulse within a burst.

64 Claims, 11 Drawing Sheets

U.S. PATENT DOCUMENTS

| | | | | |
|---|---|---|---|---|
| 5,023,884 | A | 6/1991 | Akins et al. | 372/57 |
| 5,025,445 | A | 6/1991 | Anderson et al. | 372/20 |
| 5,025,446 | A | 6/1991 | Kuizenga | 372/21 |
| 5,189,678 | A | 2/1993 | Ball et al. | 372/28 |
| 5,313,481 | A | 5/1994 | Cook et al. | 372/37 |
| 5,315,611 | A | 5/1994 | Ball et al. | 372/56 |
| 5,359,620 | A | 10/1994 | Akins | 372/58 |
| 5,373,523 | A * | 12/1994 | Fujimoto et al. | 372/59 |
| 5,448,580 | A | 9/1995 | Birx et al. | 372/38 |
| 5,471,965 | A | 12/1995 | Kapich | 123/565 |
| 5,852,621 | A | 12/1998 | Sandstrom | 372/25 |
| 5,863,017 | A | 1/1999 | Larson et al. | 248/176.1 |
| 5,953,360 | A | 9/1999 | Vitruk et al. | 372/87 |
| 5,978,394 | A | 11/1999 | Newman et al. | 372/32 |
| 5,978,405 | A | 11/1999 | Juhasz et al. | 372/57 |
| 5,991,324 | A | 11/1999 | Knowles et al. | 372/57 |
| 6,005,879 | A | 12/1999 | Sandstrom et al. | 372/25 |
| 6,016,325 | A | 1/2000 | Ness et al. | 372/38 |
| 6,018,537 | A | 1/2000 | Hofmann et al. | 372/25 |
| 6,028,880 | A | 2/2000 | Carlesi et al. | 372/58 |
| 6,067,311 | A | 5/2000 | Morton et al. | 372/57 |
| 6,094,448 | A | 7/2000 | Fomenkov et al. | 372/102 |
| 6,104,735 | A | 8/2000 | Webb | 372/37 |
| 6,128,323 | A | 10/2000 | Myers et al. | 372/38 |
| 6,151,349 | A | 11/2000 | Gong et al. | 372/58 |
| 6,164,116 | A | 12/2000 | Rice et al. | 73/1.72 |
| 6,192,064 | B1 | 2/2001 | Algots et al. | 372/99 |
| 6,208,674 | B1 | 3/2001 | Webb et al. | 372/57 |
| 6,208,675 | B1 | 3/2001 | Webb | 372/58 |
| 6,212,211 | B1 | 4/2001 | Azzola et al. | 372/33 |
| 6,219,368 | B1 | 4/2001 | Govorkov | 372/59 |
| 6,240,117 | B1 | 5/2001 | Gong et al. | 372/58 |
| 6,314,119 | B1 | 11/2001 | Morton | 372/57 |
| 6,317,447 | B1 | 11/2001 | Partlo et al. | 372/57 |
| 6,330,261 | B1 | 12/2001 | Ishihara et al. | 372/38.1 |
| 6,414,979 | B2 | 7/2002 | Ujazdowski et al. | 372/87 |
| 6,477,193 | B2 | 11/2002 | Oliver et al. | 372/58 |
| 6,535,531 | B1 | 3/2003 | Smith et al. | 372/25 |
| 6,549,551 | B2 | 4/2003 | Ness et al. | 372/38.07 |
| 6,567,450 | B2 | 5/2003 | Myers et al. | 372/55 |
| 6,570,899 | B1 | 5/2003 | Yabu et al. | |
| 6,625,191 | B2 | 9/2003 | Knowles et al. | 372/55 |
| 6,690,704 | B2 | 2/2004 | Fallon et al. | 372/58 |
| 6,693,939 | B2 | 2/2004 | Klene et al. | 372/58 |
| 6,704,339 | B2 | 3/2004 | Lublin et al. | 372/57 |
| 6,704,340 | B2 | 3/2004 | Ershov et al. | 372/58 |
| 2001/0028670 | A1* | 10/2001 | Tamura et al. | 372/55 |

FOREIGN PATENT DOCUMENTS

| | | | |
|---|---|---|---|
| JP | 60187073 | * | 9/1985 |
| JP | 60197073 | * | 9/1985 |

* cited by examiner

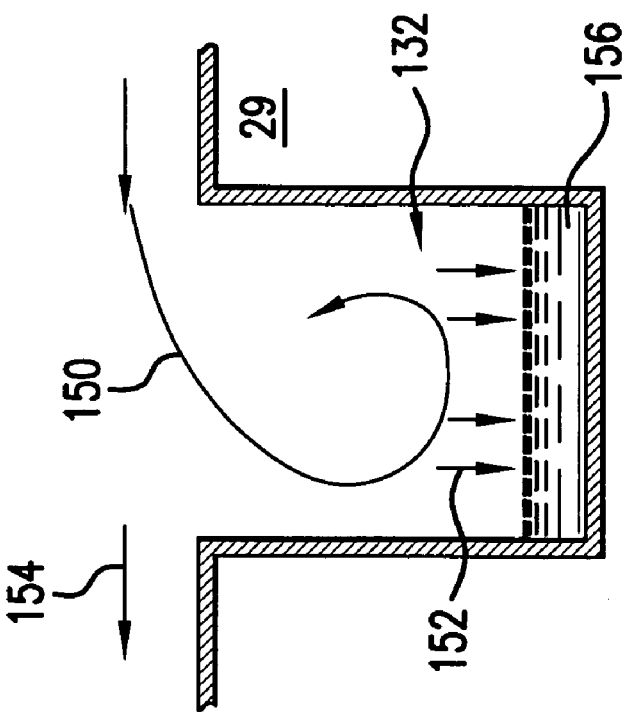
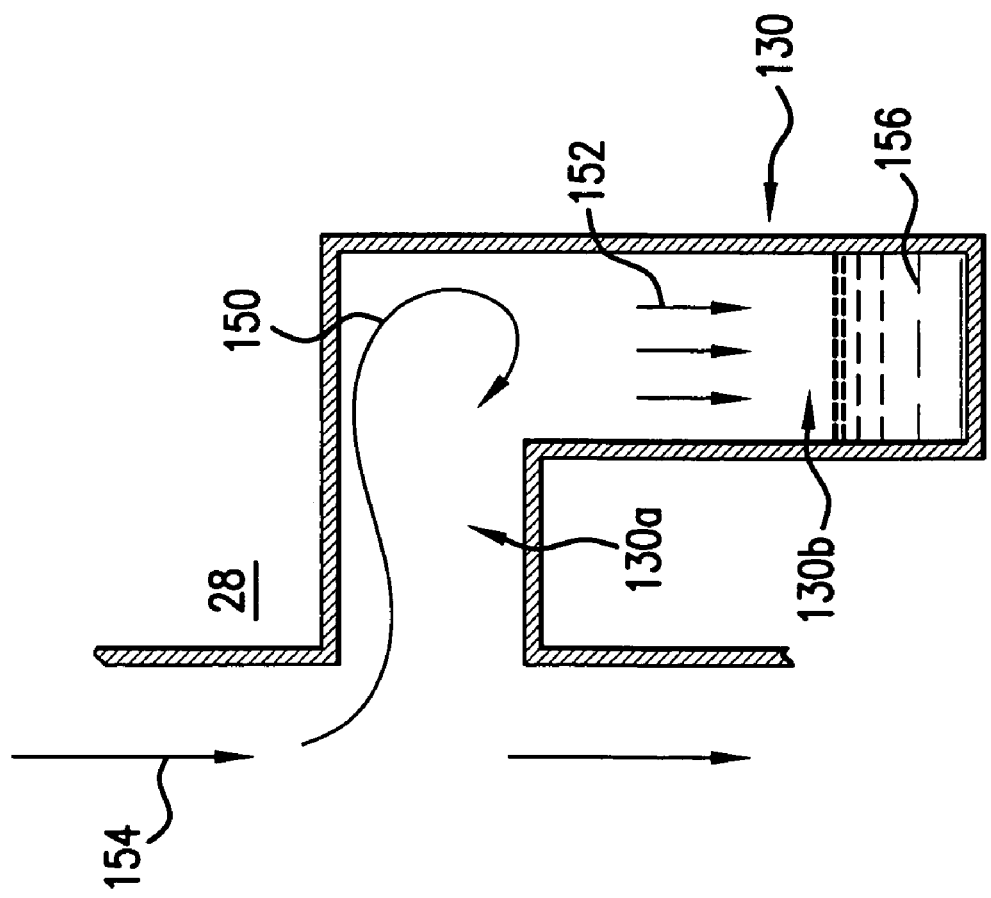

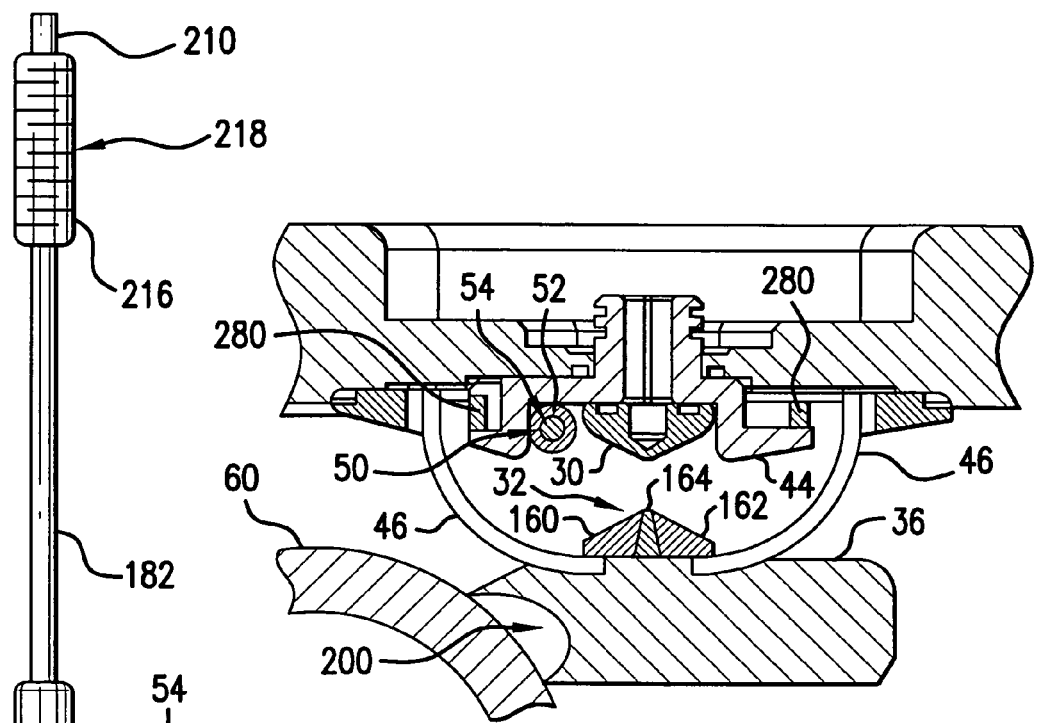
FIG. 7
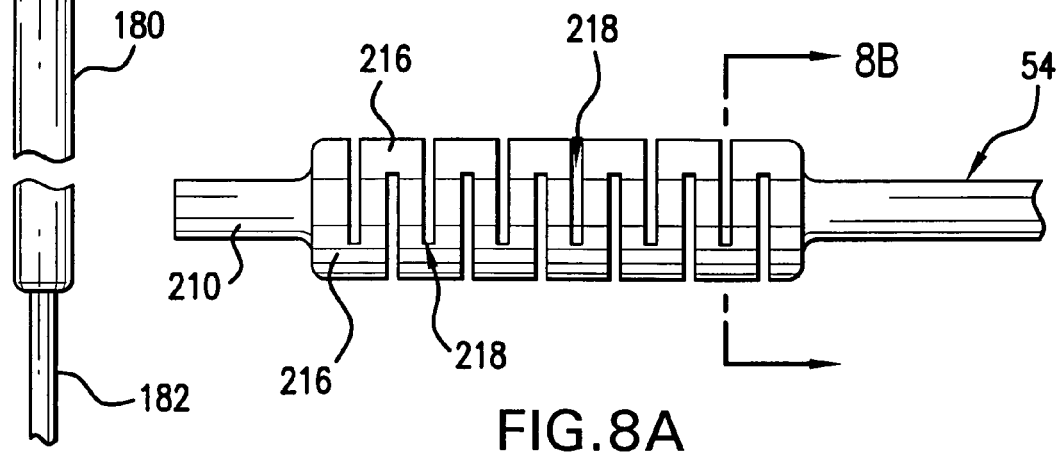
FIG. 8A
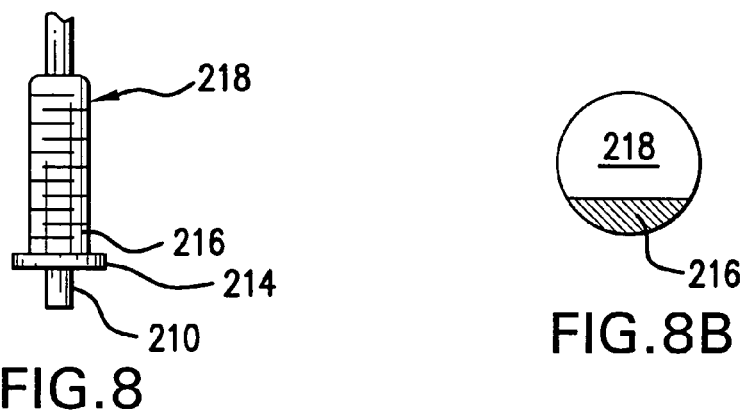
FIG. 8
FIG. 8B

GAS DISCHARGE LASER CHAMBER IMPROVEMENTS

FIELD OF THE INVENTION

The present invention relates to gas discharge lasers, e.g., those used in the production of high power high output pulse repetition rate high stability UV light sources, e.g., DUV light, e.g., for the exposure of integrated circuit photoresists in integrated circuit lithography manufacturing processes.

BACKGROUND OF THE INVENTION

It is known that in gas discharge lasers, e.g., utilizing fluorine in the laser gas, e.g., KrF, ArF and $F_2$ gas discharge lasers, there is a great propensity for the production of debris, e.g., in the form of metal fluorides, e.g., due to the interaction of fluorine with metallic components within the laser gas discharge chamber. This can occur particularly during gas discharge, and e.g., with metal materials in the electrodes between which the electric discharge occurs to cause the gas discharge, a chemical and electrical phenomenon that generates radiation. Such gas discharge lasers may be used particularly at or about a selected desired center-wavelength, e.g., for KrF gas discharge lasers at about 248 nm and for ArF gas discharge lasers at about 193 nm. This debris can, over time, plate out on such things a optical components of the laser chamber, e.g., chamber windows, which can cause reduced output power for a number of reasons, e.g., undesired reflection of laser light off of the optic and/or blockage of transmission of laser light through the optic. This can cause, e.g., the need to operate the laser at, e.g., an undesired elevated discharge voltage, e.g., resulting in reduction in laser chamber lifetime. In addition, under some conditions depending on fluence levels and wavelength, among other things, the plated debris can cause, e.g., localized high absorption on an optical element, resulting in earlier than normal failure of the optical element under, e.g., DUV light at high fluence. More importantly, however, dust entrained in the flowing gas can cause, e.g., scatter loss. This phenomena akin to "white-out" on a weather context, can cause the photons generated in a gas discharge between the electrodes of the gas discharge laser to so scatter that they do not reach the mirrors in the laser resonance cavity in sufficient quantities to cause adequate lasing in the excited gas medium during the discharge. This can be significant enough when the dust content is high enough, that no lasing occurs at all in a given pulse or pulses. This phenomenon increases in frequency and likelihood as the dust accumulates in the chamber over the live of the chamber, e.g., measured in billions of shots, and eventually can lead to, or at least be a significant contributor to, what is referred to in the industry as old age syndrome ("OAS"), the onset of which generally requires chamber replacement to maintain, e.g., the required output laser pulse energy (dose), and may also be impacted by such other requirements as pulse to pulse parameter stability requirements being engendered by increasingly demanding requirements, e.g., from lithography tool makers.

It is known in the art of gas discharge laser systems to provide for a debris/dust trap external to the laser gas discharge chamber, with input and output ports from the chamber and returning to the chamber for chamber gas to flow out of the chamber, through the debris trap, and back into the chamber. For example, applicants' assignee has sold gas discharge laser systems with a so-called metal fluoride trap ("MFT") having a trap inlet and a trap outlet, e.g., near an output window for generated laser light, to flush the area of that window with cleaned gas, as shown, e.g., in U.S. Pat. No. 5,018,161, entitled COMPACT EXCIMER LASER, issued to Akins et al. on May 21, 1991, e.g., as also shown in e.g., the 7000 series and XLA series lasers. Such an external trap may be electrostatic, requiring extra cost and power consumption added to the economics of utilizing such laser systems. Also U.S. Pat. No. 5,373,523, entitled EXCIMER LASER APARATUS, issued to Fujimoto on Dec. 13, 1994 shows an external dust trap on the side of a laser gas discharge chamber. U.S. Pat. No. 6,570,899, entitled GAS LASER DEVICE, issued to Yabu et al. on May 27, 2003, based upon an application Ser. No. 09/648,630, filed on Aug. 28, 2000, illustrates another form of external debris trap.

These types of external traps are also bulky, and tend to fill and become clogged and require replacement, or potentially allow undetected operation over, e.g., several billion laser output pulses ("shots") of operation with "dirty" gas wherein unwanted OAS events, e.g., zero or low pulse energy lasing are occurring. In addition, they may not be capable of removing debris from the gas circulating within the laser gas discharge chamber fast enough, e.g., at elevated repetition rates of 4K and above, and especially at, e.g., the 6K and 8K and above levels, to prevent detrimental effects on the discharge due to debris presence in the gas between the electrodes at the time of discharge, which, e.g., is variable from discharge to discharge with resultant detrimental effects on such things as bandwidth and wavelength stability, beam shape and spatial coherence stability, etc.

As laser light pulse output repetition rates have increased, along with tighter and tighter controls required on such things as center wavelength, bandwidth and dose and the stability of such characteristics of the laser output light pulses have become necessary for keeping up with the demands of, e.g., integrated circuit lithography light sources, it has become even more important to effectively, efficiently and quickly remove debris, e.g., metal fluoride dust and the like from the circulating gas.

Debris removal from the gas, e.g., between discharges in the gas discharge chamber between the electrodes can, e.g., require very high fan motor speeds that both add temperature to the chamber gas and vibrations that can interfere with meeting laser output light parameter requirements and/or interfere with maintaining stability over time and over different duty cycles and over different output light pulse repetition rates. More debris in the gas can increase rates of deposition of the debris on optical elements, e.g., chamber windows contributing to reductions in performance and/or failures of the optical elements requiring more frequent replacements that are desirable. For these reasons there is a need for an improved debris removal system and method for very high repetition rate narrow band gas discharge lasers. According to aspects of an embodiment of the present invention applicants have proposed additional, low cost, easily implemented and very reliable means for debris removal from the gas circulating within the gas circulation flow path in the laser gas discharge chamber. This also, e.g., extends the life of the MFT, whose function is mostly to maintain a supply of cleaned gas to the chamber window regions.

It is also known in the art of gas discharge laser light sources to utilize preionization of the gas discharge region between gas discharge electrodes that produce the chemical and electrical changes in the gas between the electrodes. Each discharge of electrical energy between the electrodes causes laser light emission and/or amplification, e.g., in an oscillator resonance cavity or an amplification chamber, e.g., amplifying a narrow banded beam output from an oscillator chamber, e.g., in a master oscillator, power amplifier ("MOPA") configuration. Preionization may be done, e.g., in lasers sold by applicants' assignee with one or more preionization tubes positioned near the gas discharge region. The preionization tubes emit, via, e.g., a corona discharge UV and X-ray radiation which creates electrons via photoionization in the gas between the electrodes assisting the onset of the electric discharge in the gas between the electrodes. Applicants have determined that photoionization in the gas discharge region is less than ideal because most of the electrons are formed in the region of the preionization tube(s) and not in the gas discharge region. Such spatial nonuniformity of the electron distribution is believed by applicants to contribute to adverse effects on energy stability, especially early in a burst of laser output pulses. Applicants, therefore, according to aspects of an embodiment of the present invention propose certain methods and apparatus for improvement of preionization. Applicants propose a number of other improvements for the preionization.

In addition, it is known that acoustic effects in the laser can interfere with proper formation of the discharge in the discharge region, e.g., uniformity in the horizontal or vertical axes of the discharge, which can be caused by a variety of sources of acoustic wavefronts produced in and transmitted through the gas discharge chamber, including, e.g., from the gas circulation fan. Applicants herein propose ways to mitigate or eliminate most of such harmful effects, e.g., on the shape of the discharge.

Another problem facing the operation of gas discharge lasers, particularly as the requirements, e.g., for lithography light sources call for ever narrower bandwidths, bandwidth stability and center wavelength stability shot to shot, power (dose) stability shot to shot or at least over a plurality of shots on average, e.g., within a burst of shots, is in chamber acoustic effects on the repeatability shot to shot. Such requirements for repeatability may, e.g., require essentially exactly the same gas discharge conditions. In addition to the variability of the gas debris content mentioned above there are other possible sources of variability, e.g. two principal sources of these acoustic variations in the gas discharge chamber, shock waves generated from the spinning of and, to a degree, vibrations within the gas circulating fan and acoustic waves created by a prior discharge reflecting back to the discharge in time with a subsequent discharge, and, usually also aligned to the longitudinal axis of the discharge so as to substantially effect the entire length of the subsequent discharge.

According to aspects of an embodiment of the present invention applicants have proposed certain methods and apparatus for the mitigation of these detrimental effects on high repetition rate (e.g., 4 KHz+), high power (e.g., 40 W+), narrow banded, e.g., <about 0.25 pm bandwidth at full width half max ("FWHM") for ArF and <1.2 pm E95% for ArF and less than about 0.35 pm FWHM and 1.5 pm E95% for KrF, laser light sources. Along with the above are requirements, e.g., for tighter dose stability requirements, e.g., ±about 0.3% for dense lines and less than that for isolated lines, wavelength stability, e.g., ±0.1 pm 3σ, and bandwidth stability, e.g., about ±0.05 pm FWHM 3σ, all of which will become even more stringent requirements as feature sizes ("critical dimensions" "CDs") continue to decrease with resulting decreases in $k_1$, along with increasing throughput and therefore dose requirements.

SUMMARY OF THE INVENTION

A method and apparatus if disclosed which may comprise a high power high repetition rate gas discharge laser UV light source which may comprise: a gas discharge chamber comprising an interior wall comprising a vertical wall and an adjacent bottom wall; a gas circulation fan creating a gas flow path adjacent the interior vertical wall and the adjacent bottom wall; an in-chamber dust trap positioned a region of low gas flow, which may be along an interior wall and may comprise at least one meshed screen, e.g., a plurality of meshed screens, which may comprise at least two different gauge meshed screens. The dust trap may extend along the bottom interior wall of the chamber and/or a vertical portion of the interior wall. The dust trap may comprise a first meshed screen having a first gauge; a second meshed screen having a second gauge smaller than the first gauge; and the second meshed screen intermediate the first meshed screen and the interior wall. The chamber may comprise a plurality of dust collecting recesses in at least one of the vertical interior wall and the bottom wall of the chamber which may be selected from a group comprising a one-part recess and a multi-part recess, which may comprise two sections angled with respect to each other. The dust trap may comprise a pressure trap positioned between a portion of a main insulator and an interior wall of the chamber. The chamber may comprise a gas circulating fan comprising a cross-flow fan with a fan cutoff that may comprise a vortex control pocket. The chamber may comprise a preionization mechanism comprising a preionization tub containing a ground rod within an elongated opening in the preionization tube that may comprise a compliant member, an automatic preionization shut-off mechanism, a preionization onset control mechanism and/or a focusing element. The chamber may comprise an elongated baffle plate that may comprise a plurality of pyramidal structures including varying numbers of generally pyramidal elements and oriented in groups of varying numbers of generally pyramidal elements and oriented along and transverse to the longitudinal axis. Acoustic resonances within the chamber may also be reduced by introducing an artificial jitter into the timing of the laser discharges varying the inter-pulse period randomly or in a repeating pattern from pulse to pulse within a burst.

BRIEF DESCRIPTION OF THE DRAWINGS

FIGS. 6A-C show in greater detail aspects of an embodiment of the present invention shown, e.g., in FIGS. 3A-B;

FIG. 7 shows aspects of an embodiment of the present invention for acoustic resonance mitigation;

FIGS. 8-8B and FIGS. 9 and 10 show aspects of an embodiment of the present invention relating to an improved preionization ground rod construction;

DETAILED DESCRIPTION OF PREFERRED EMBODIMENTS

Figure 1:
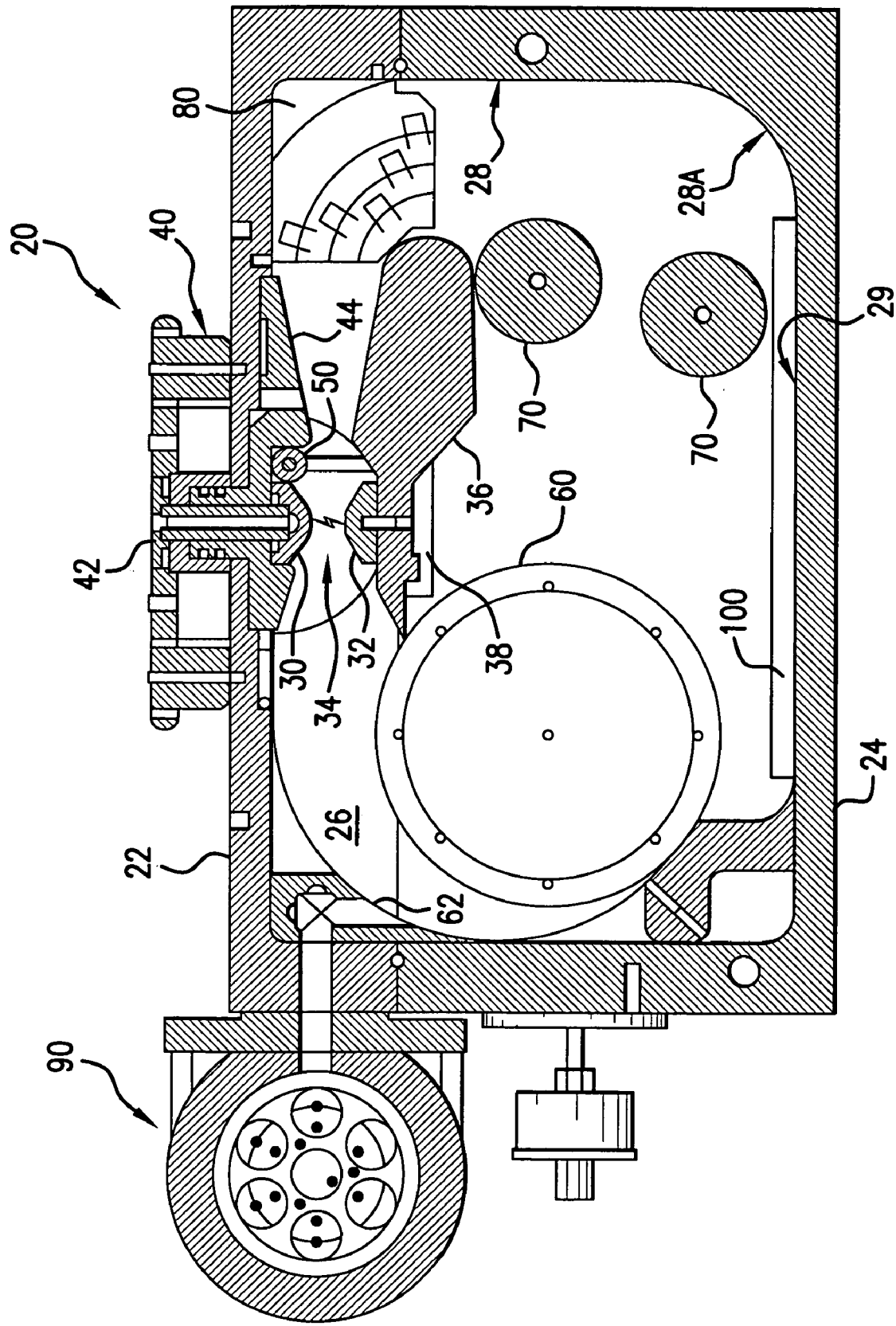
FIG. 1 shows a cross-sectional partly schematic view of a gas discharge laser chamber according to aspects of an embodiment of the present invention, with the cross-section taken transverse to an optical axis of laser output light beams produced in the gas discharge laser chamber.

Turning now to FIG. 1 there is shown a gas discharge laser system gas discharge chamber 20 according to an aspect of an embodiment of the present invention. The chamber 20 may be composed, e.g., of a chamber upper half 22 and a chamber lower half 24, which may, when connected to each other by suitable means, e.g., by bolting, serve to define a chamber interior 26. The chamber upper half 22 and chamber lower half also define, e.g., a chamber interior vertical wall 28 and the chamber lower half 24 defines a chamber interior horizontal bottom wall 29.

Also contained within the chamber 26 is, e.g., a gas discharge system comprising two elongated opposing electrodes, cathode 30 and anode 32, defining between them a gas discharge region 34, wherein in response to sufficient voltage being present across the cathode 34 and anode 32 the gas between the electrodes in the also elongated discharge region 34 conducts and certain chemical and electrical reactions take place in the ionized plasma of the discharge that result in the production of radiation, e.g., at or near a characteristic center wavelength, that is optically directed along the optical axis of an output laser light pulse generally aligned to the longitudinal axis of the electrodes 30, 32.

Also within the chamber 26 may be, e.g., an anode support 36, which may be made, e.g., of a suitable dielectric material, e.g., a ceramic material, and an anode support bar 38, which may be made of a suitable conductive material, e.g., brass. the anode may be connected to the chamber upper half 22 through a plurality of current returns 46, with the chamber top 22, along with the chamber bottom 24, e.g. kept as a common voltage, e.g., at ground voltage.

The cathode 32 may, e.g., be connected to an electrical discharge high voltage feed through assembly 40, e.g., by a high voltage feed through 42, which passes through a main insulator 44. The main insulator 44 may keep the cathode electrically isolated from the chamber upper half 22.

Also within the chamber interior 26 may be, e.g., a preionizer 50, e.g., in the vicinity of the cathode 30. The preionizer 50 may include, e.g., a ground rod 52 that may be made of a suitable conductive material, e.g., brass (shown in more detail in FIGS. 7, 11 and 12), and may, e.g., be substantially enclosed within the interior of a, e.g., hollow cylindrical preionizer tube 54, which may be made of a suitable dielectric material, e.g., a ceramic. The preionizer 50 may have, e.g., a cylindrical centerline axis that is generally parallel to the longitudinal centerline axis of the cathode 30 and anode 32 and, therefore, also the discharge region 34. The preionizer 50 may, in operation, e.g., function based upon the difference in voltage between the cathode 34 and the ground rod 52. In addition the preionizer 50 may operate due to the difference in electrical potential between a conducting shim 56, shown in more detail in FIGS. 11 and 12, which occupies the space between the preionizer 50 and the main insulator 44 along substantially the length of the preionizer 50, or at least along substantially the entire length of the cathode 30, and which is in electrical contact with the cathode 30.

Also within the gas discharge chamber 26 may be, e.g., a gas circulation system comprising, e.g., a gas circulation fan 60, which may be, e.g., a generally cylindrical crossflow fan 60. The fan 60 serves to move gas within the chamber interior 26, generally in a circular fashion as seen, e.g., in the cross-sectional view of, e.g., FIG. 1, in order to, e.g., remove from the discharge region 34 between successive gas discharges the gas that contains, e.g., ionized particles and debris and depleted $F_2$, to replenish the discharge region, e.g., with fresh gas, e.g., containing $F_2$ before the next successive gas discharge. The gas circulation system may also include a plurality of heat exchangers 70 in the generally circular gas flow path to remove heat added to the gas, e.g., by the discharges and the operation of the fan 60.

The gas circulation system may also have, e.g., a plurality of curved baffles 80 and a flow directing vane 62, which may serve, e.g., to shape the generally circular gas flow path out of the discharge region 34 toward the heat exchangers 70 and ultimately the intake of the fan 60 and from the output of the fan 60 to the discharge region 34, respectively.

The chamber 26 may also have a metal fluoride trap 90 as is known in the art, although an aspect of an embodiment of the present invention is to replace the MFT where possible.

Also contained in the chamber interior 26, e.g., along the horizontal bottom interior wall 29 of the bottom 24 of the chamber 20 may be, e.g., a dust trap 100. It will be understood that by dust is meant the various forms of debris, e.g., mostly metal fluoride material, that circulates with the gas circulation and appears to the naked eye to be dust-like or lint-like.

The dust trap 100 according to an aspect of an embodiment of the present invention may be illustrated by reference to FIGS. 2A-D as an example. As shown in FIGS. 2A-D, the dust trap 100 may be comprised of at least one meshed element, e.g., a wire mesh 102 having a first gauge, e.g., [___] and a first pitch, e.g., [___] and may be comprised of vertical mesh members 102a and horizontal mesh members 102b, e.g., made of wire of, e.g., a suitable metallic material, e.g., brass. Each wire may have, e.g. a wire gauge, i.e., diameter, e.g., [___]. The meshed horizontal mesh members 102b and vertical mesh members 102a may form mesh openings, illustrated according to an aspect of an embodiment of the present invention to be rectilinear, but to be understood to be of any suitable meshed shape, e.g., triangular and/or of square or rectangular shape may be employed.

The dust trap 100 may also comprise, e.g., a second meshed element 104, which may be similar to the first mesh element 102, but may comprise a second gauge and pitch smaller than the first, e.g., [___] and [___]. It will also be understood that the second meshed element 104 may also have horizontal mesh wires 104b and vertical mesh wires 104a having a respective wire gauge or gauges, and forming mesh openings 108 of any possible suitable shape. The first and second meshed elements 102, 104 may have differing shaped mesh openings. It is also possible according to an aspect of an embodiment of the present invention to have more than two different meshed elements varying, e.g., in gauge, pitch and opening shape and wire gauge size.

Figure 2A:
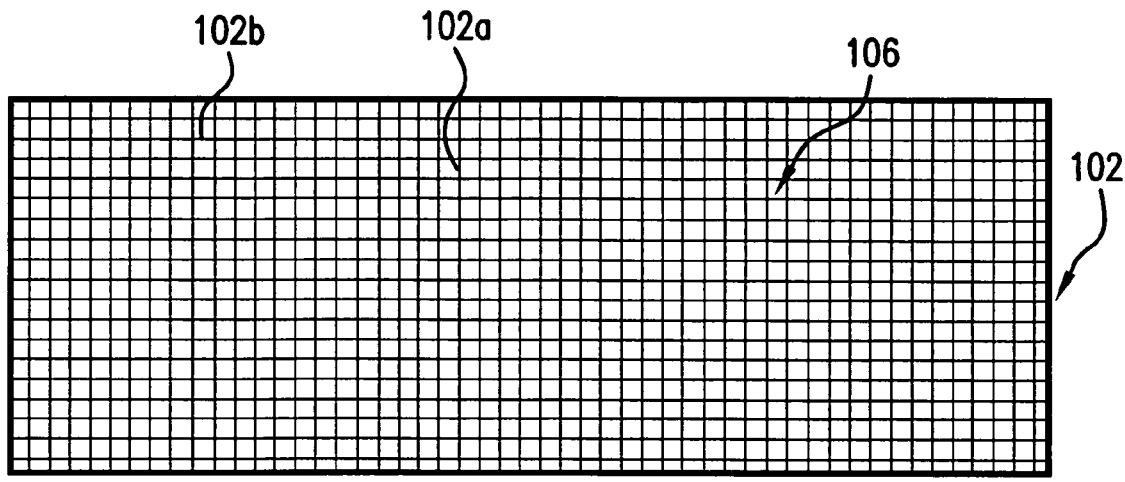
FIGS. 2A-D show aspects of an embodiment of the present invention employing in-chamber debris catching and holding.
Figure 2B:
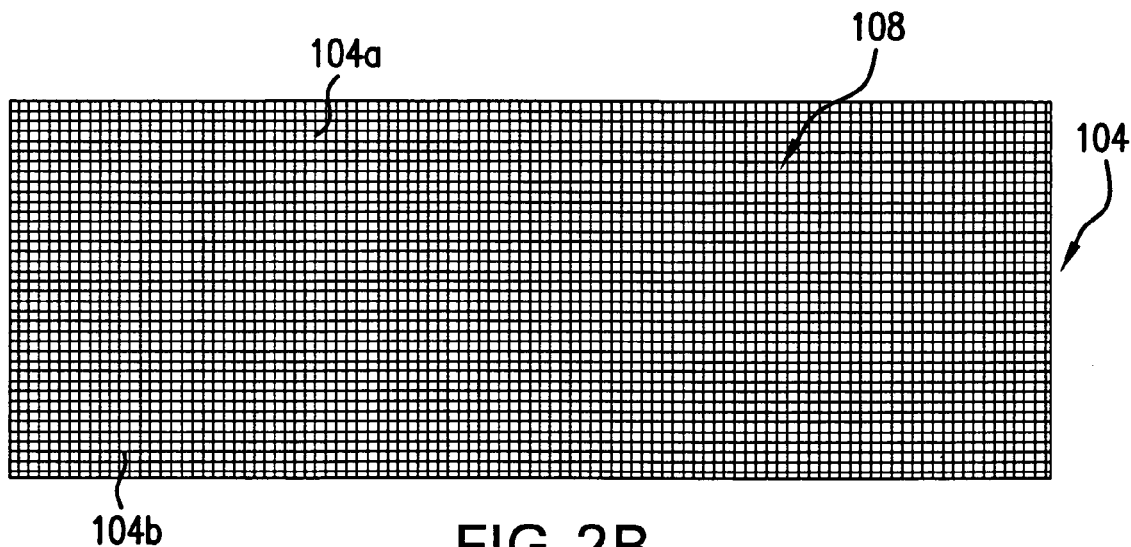
Figure 2C:

Turning now to FIGS. 2C and D there is illustrated, by way of example, two of the many possible arrangements of meshed elements, e.g., 102,104 according to aspects of an embodiment of the present invention. In FIG. 2C there is shown an embodiment in which meshed elements 102, 104, e.g., of generally the same thickness, but with differing, e.g., gauge, wire gauge size, opening shape or the like, are layered one on top of the other, e.g., in a four layer embodiment. It will also be understood that each of the meshed elements 102, 104 as illustrated in FIG. 2C may be different in one or more of the respects noted above, or that a pattern may be repeated, e.g., every third layer, e.g., in a six layer embodiment. That is to say that the dust trap 100 may comprise, e.g., six layers, with the first three differing from each other e.g., narrowing in opening size and the next three being a repeat of the first three. It will also be under stood that the dust trap 100 could comprise, e.g., only the first three such layers just described.

Figure 2D:
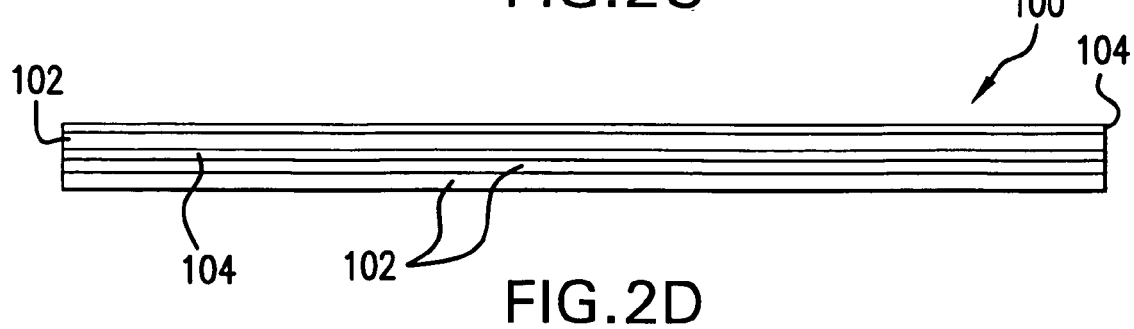

Turning to FIG. 2D there is shown aspects of an alternative embodiment according to the present invention. In FIG. 2D there is illustrated, by way of example, an embodiment in which meshed elements, e.g., 102, 104 of differing thicknesses in the vertical direction (as that direction is shown for illustrative purposes in FIG. 2D) are layered to form the dust trap 100'. It will be understood, that, as with FIG. 2C, the various mesh elements 102,104, may be the same or differ from each other in aspects noted above apart from the varying thickness. As illustrated in FIG. 2D, the dust trap 100' comprises two alternating thin (104) and thick (102) mesh elements placed on top of an additional thick meshed element 102. It will also be understood that, for convenience, the thick meshed elements shown in FIG. 2D are illustrated to be the larger meshed elements 102 illustrated in FIG. 2A, but this need not be the case, and one or more of the thicker meshed elements illustrated in FIG. 2D may be of smaller gauge and/or pitch and/or wire gauge size.

Figure 3A:
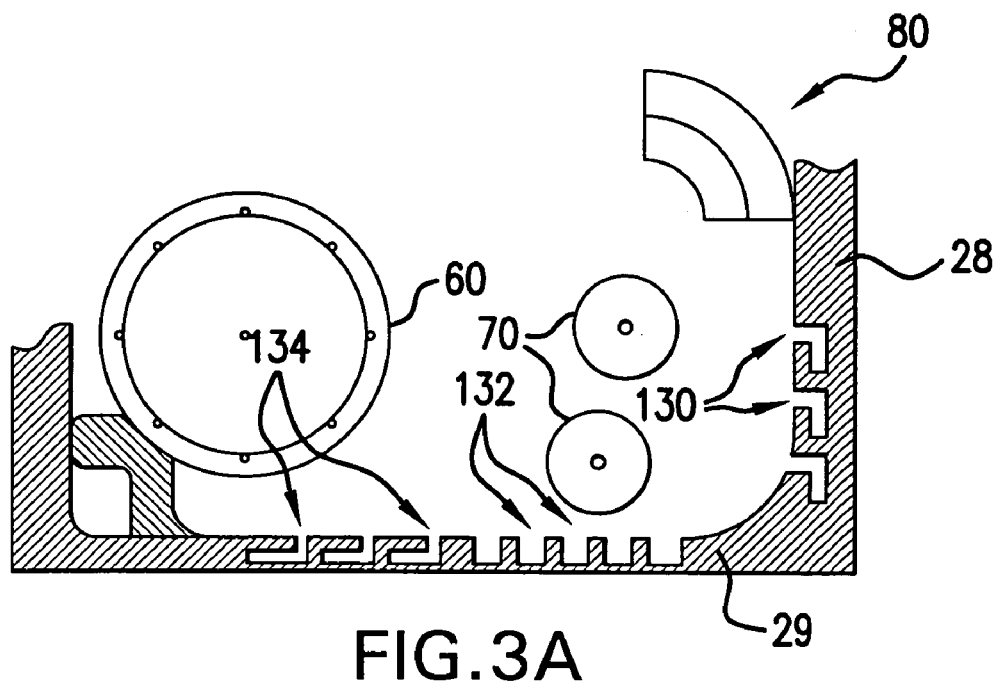
FIGS. 3A-C show aspects of another embodiment of the present invention employing in chamber debris catching and holding.
Figure 3B:
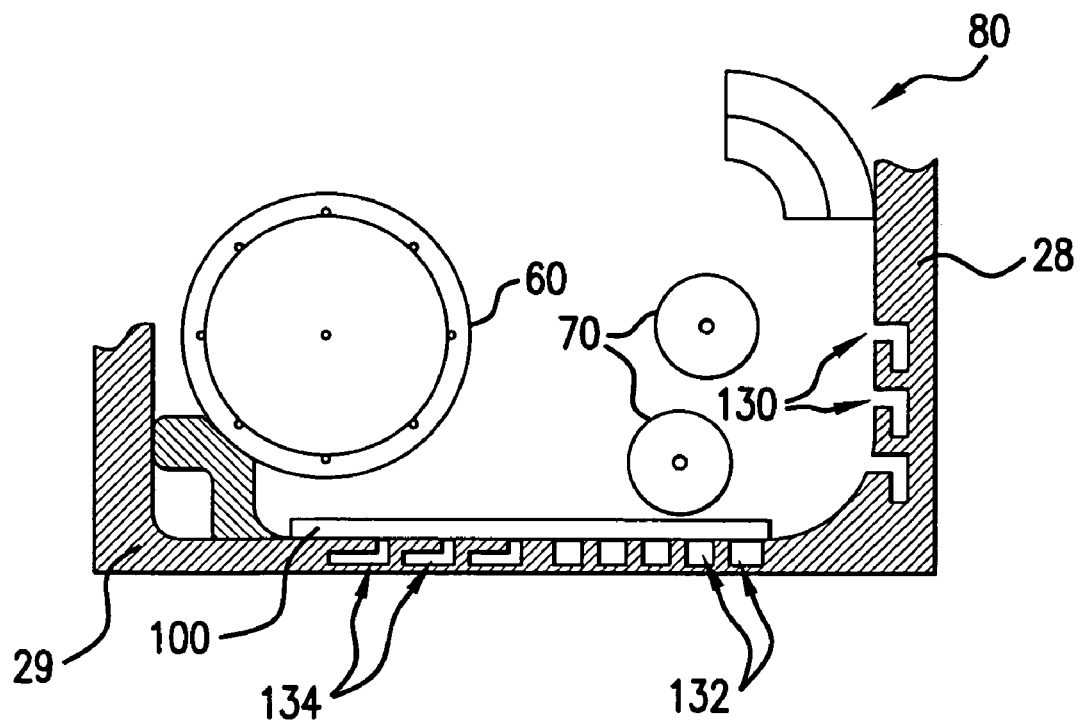
Figure 3C:
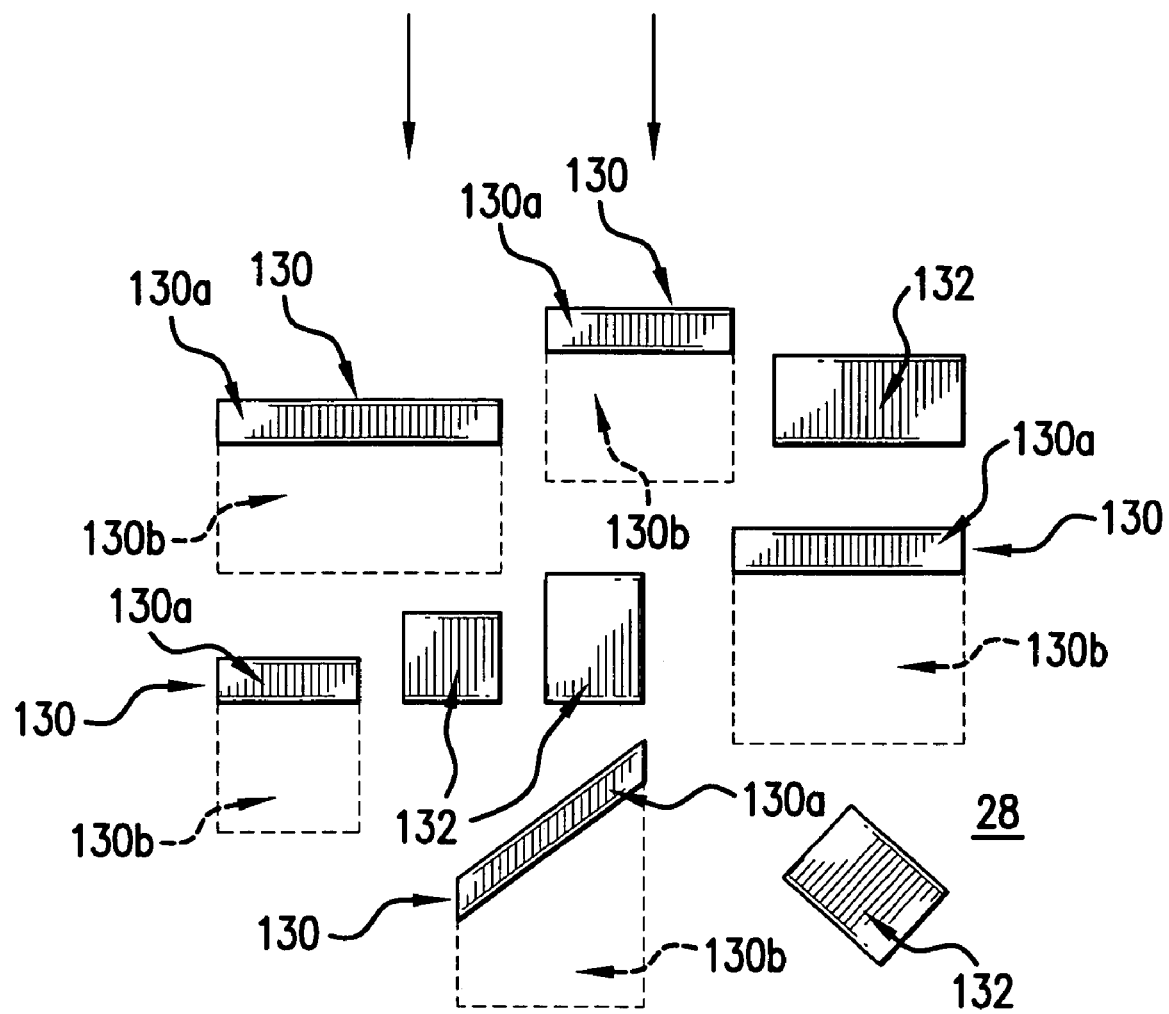

FIGS. 3A-C illustrate an aspect of an embodiment of the present invention wherein dust catcher/collector elements, e.g., 130, 132, 134 may, e.g., be formed in the interior wall portions, e.g., 28, 29 of the chamber 20. According to an aspect of an embodiment of the present invention, the elements 130, 134 may comprise a first portion 130*a*, 134*a* and a second portion 130*b*, 134*b* extending in a direction angled from the respective first portion 130*a*, 134*b* and the elements 132 may have only a single portion formed, e.g., in the respective portion, e.g., walls 28, 29 of the chamber 20.

FIG. 3C illustrates schematically the fact that the dust catchers/collectors, e.g., 130, 132 may be randomly sized, positioned and oriented along, e.g., a wall of the chamber 20, e.g., wall 28, e.g., with the flow from top to bottom of FIG. 3C as illustrated. For example, two piece catcher/collectors 130 may be spaced at differing heights along, e.g., wall 28 (which it will be understood could just as well be, e.g., bottom 29) and having differing widths horizontally (as that direction is illustrated in FIG. 3C to be horizontal on the page) and can even be oriented, e.g., diagonally. It will also be understood that it is possible according to aspects of an embodiment of the present invention for the illustrated wall, e.g., wall 28 to be rotated along with the illustrated catcher/collectors 130, 132 so that flow is still from top to bottom of the illustration, as so rotated, but is incident on the openings 130, 132 at a ninety degree (or perhaps, e.g., even a forty-five degree) angle to that illustrated in FIG. 3C. Also illustrated is the possibility of intermingling the two piece catcher/collectors, e.g., 130 with the single piece ones 132.

Figure 5:
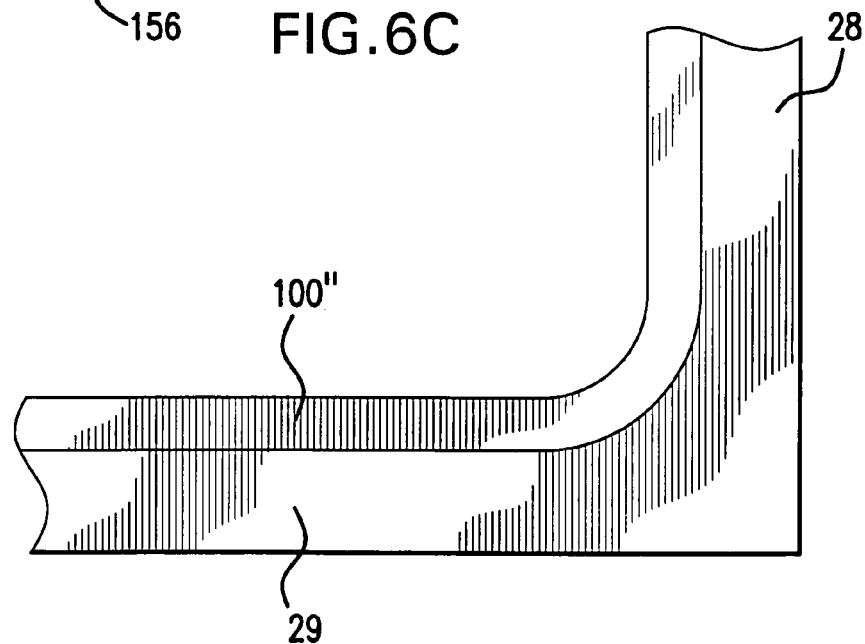
FIG. 5 shows schematically another aspect of an embodiment of the present inventions regarding in-chamber debris catching and holding.

FIG. 3B shows an aspect of an embodiment of the present invention in which, e.g., a dust trap 100 may be combined with dust catcher and collector elements, e.g., 132, 134. FIG. 1 illustrates an aspect of an embodiment of the present invention in which a dust trap 100 rests on (or is suitably attached to), e.g., the horizontally extending (as that direction is shown in FIG. 1 for illustrative purposes) floor 29 of the chamber and FIG. 5 illustrates an aspect of an embodiment of the present invention where a dust trap 100" is positioned along both the bottom 28 and vertical side wall 28 of the chamber 20.

In operation the above-described dust collectors/traps have the effect of minimizing the equilibrium particle density of the debris in the gas flow without significantly increasing the impedance within the chamber interior 26 to gas circulation. This is important because at higher gas discharge repetition rates, e.g., beyond 4 KHz the blower power and heat budget becomes a critical performance issue as well as blower wear, e.g., bearing wear at higher speeds and eventual requirements for blower replacement due to excessive vibration. The collectors/traps may also be assisted in their operation by the changing gas flow patterns as the fan is cycled through on and off periods and as flow recommences in the on cycle. In operation with the collectors, e.g., 130, 132, 134 and or traps, e.g., 100, 100', 100" in and/or along the walls of the chamber, essentially in the boundary flow region, the boundary layer flow, along what would be the otherwise smooth-wall, may, e.g., be disrupted in such a way that particles of debris (so-called dust) are accelerated into the openings, e.g., 130, 132, 143 in the wall and/or meshed elements in the dust traps, e.g., 100, 100' and 100", and once inside essentially cannot return to the gas flow inside the chamber interior 26. For example once inside the meshed elements of the traps 100, 100', 100", e.g., having entered a mesh opening in the outermost layer, the particle may, e.g., be slowed by eddy currents, or otherwise, and then is further slowed in each succeeding meshed layer such that the particles then remain within the meshed structure. Applicants also suspect that flow can be created, e.g., around the wire in the mesh, e.g., orthogonal to the flow direction, which also accelerates particles in the direction of the next succeeding internal mesh layer.

Figure 4:
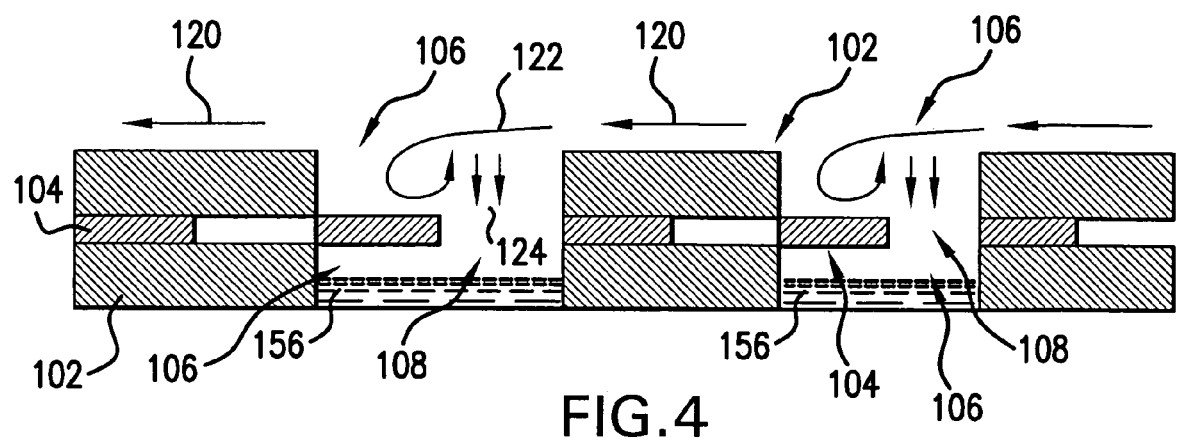
FIG. 4 shows schematically an aspect of an embodiment of the present invention regarding in-chamber debris catching and holding.

This so-called boundary layer effect is taken advantage of by applicants according to aspects of an embodiment of the present invention. With regard to the dust trap 100,100', 100", as illustrated very schematically and not to proportion in FIG. 4, the meshed element, e.g., 102 openings, e.g., 106 presented to the flow 120, e.g., in the boundary layer present an opportunity for debris to precipitate out of the flow as illustrated at 124, pass through, if appropriate, openings, e.g., 108 in an underlying meshed element layer, and then perhaps be collected in a pocked formed, e.g., by openings, e.g., 106 in a still further underlying meshed element layer, e.g., 102. Applicants believe that the flow in the boundary layer near the boundaries of the gas circulation path is slow enough to encourage debris to enter the exposed openings, e.g., 106 as illustrated in FIG. 4 and fast enough to also encourage, e.g., eddy currents 122 to form, which further encourages the precipitation 124.

Figure 6C:
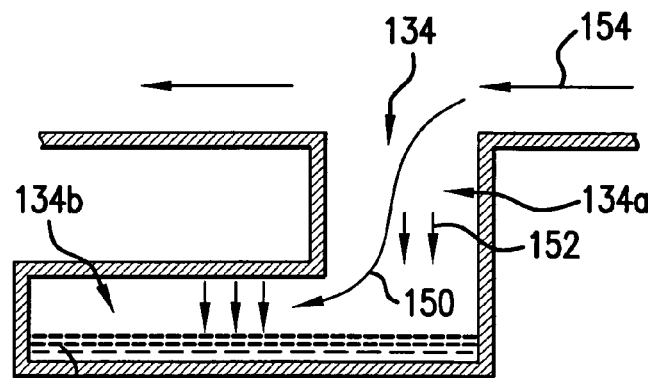

FIGS. 6A-C illustrate the operation dust traps 100-100" according to aspects of an embodiment of the present invention. It will be understood by those skilled in the art of fluid dynamics that the gas circulation in the generally circular circulation path referenced above is of relatively high velocities, e.g., measured at points in the cross-section of the circulation path on the order of tens of meters per second, determined, e.g., by the amount of gas flow necessary through the discharge region to adequately and properly clear the discharge region between shots. More toward the boundaries of the container in which the gas is circulating, e.g., the wall sections 28, 29, due, e.g., to friction of the moving gas along these boundary portions, the gas flow slows down until its profile at the surface of the boundary element, e.g., interior wall 28 or 29 to zero or almost zero.

FIG. 5 illustrates an aspect of an embodiment of the present invention wherein a dust trap 100" lies along a wall, e.g., wall 28 and the bottom 29 of the chamber interior 26.

Applicants have found that after relatively short operating times the floating debris being circulated with the laser gas in the gas circulation path essentially all collects in the dust collector, e.g., a dust collector 100 on the floor of the chamber 20 and does not thereafter significantly migrate or get shocked back into the gas circulation flow path. In the past, applicants believe that dust tended to precipitate to the bottom of the chamber, but that various acoustic and other shock wave and vibrational disturbances then periodically entrained the dust, or significant quantities of it, back into the gas circulation path. A dust trap, e.g., 100, 100', 100" according to aspects of an embodiment of the present invention have been found by applicants to virtually eliminate the reintrainment of dust collected in the dust traps, e.g., 100, 100' and 100" according to aspects of embodiments of the present invention.

Similarly, the catcher and collector elements, 130, 132 and 134 are believed to work alone or in conjunction with a dust trap 100, 100', 100", e.g., as shown in FIG. 3B in a similar fashion, e.g., as illustrated in FIGS. 6A-C, wherein flow and currents 150, e.g., eddy currents from the boundary layer flow 154 and into and within the openings 130, 132 and 134 in the walls, e.g., 28, 29 of the chamber 20, cause the deposition of debris 156 and, especially in the shapes such as 130 and 134, discourage or prevent its subsequent removal. It will also be understood that the openings 132 (basically grooves in the chamber interior walls, e.g., 28 and 19) may be of other shapes in cross section and the openings 130, 132 and 134 may be of irregular sized and spacing horizontally and/or vertically. It will also be understood that the openings, e.g., 130, 132, 134 may be formed in a plate separate from the wall(s) e.g., 28, 29 and attached, e.g., by bolting, to the respective wall(s), e.g., 28, 29. The dust collectors, e.g., 100, 100', 100" may also be bolted to the respective wall(s), either at the periphery of the meshed elements, e.g., through a frame (not shown) holding the respective meshed element(s) or through the mesh itself, or both.

Turning now to FIG. 7, there is shown aspects of an embodiment of the present invention wherein an element acting as a cutoff for the fan, e.g., an anode support 36, may have formed therein a pocket 200. The pocket may serve, e.g., to improve flow efficiency in the chamber 26 by, e.g., improving the control of the fan vortex location allowing a greater pressure drop across the fan for a given volume of flow. This can improve the effectiveness of the replenishment of fresh gas between the electrodes between shots while at the same time not significantly raising acoustic effects from the fan operation, e.g., generated in the vortex and/or from increased fan vibrations (from, e.g., higher speed) to raise the fan pressure drop without the just described vortex control.

Figure 11:
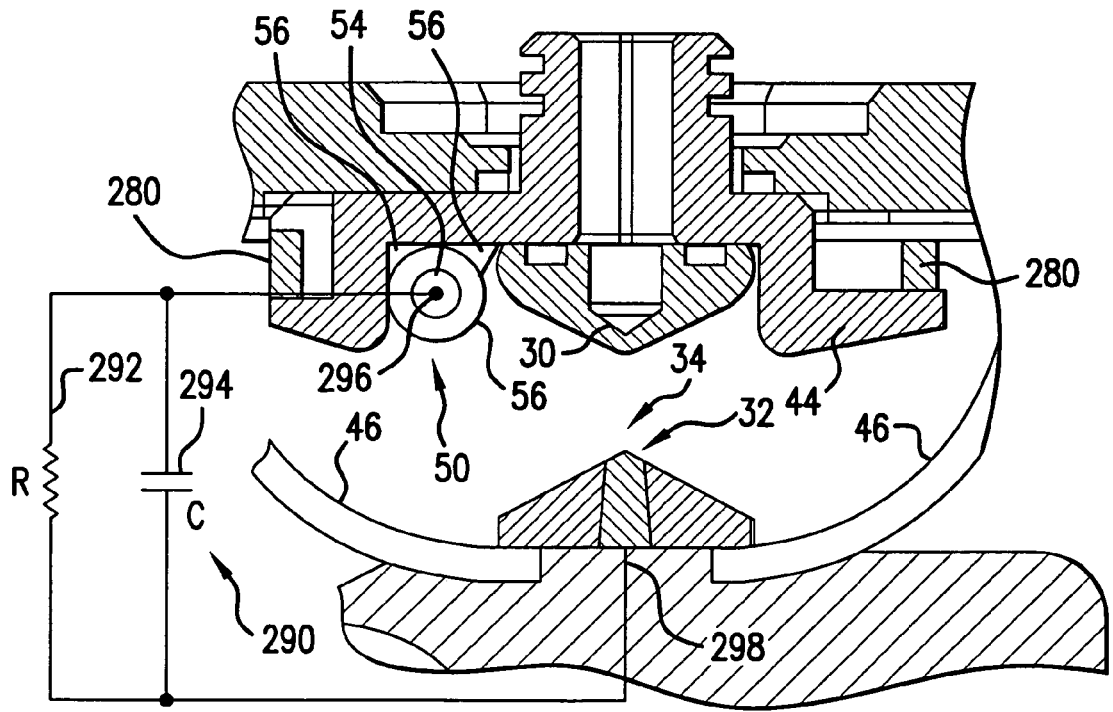
FIGS. 11-13 show aspects of embodiments of the present invention relating to improved preionization and in-chamber debris catching and holding.
Figure 12:
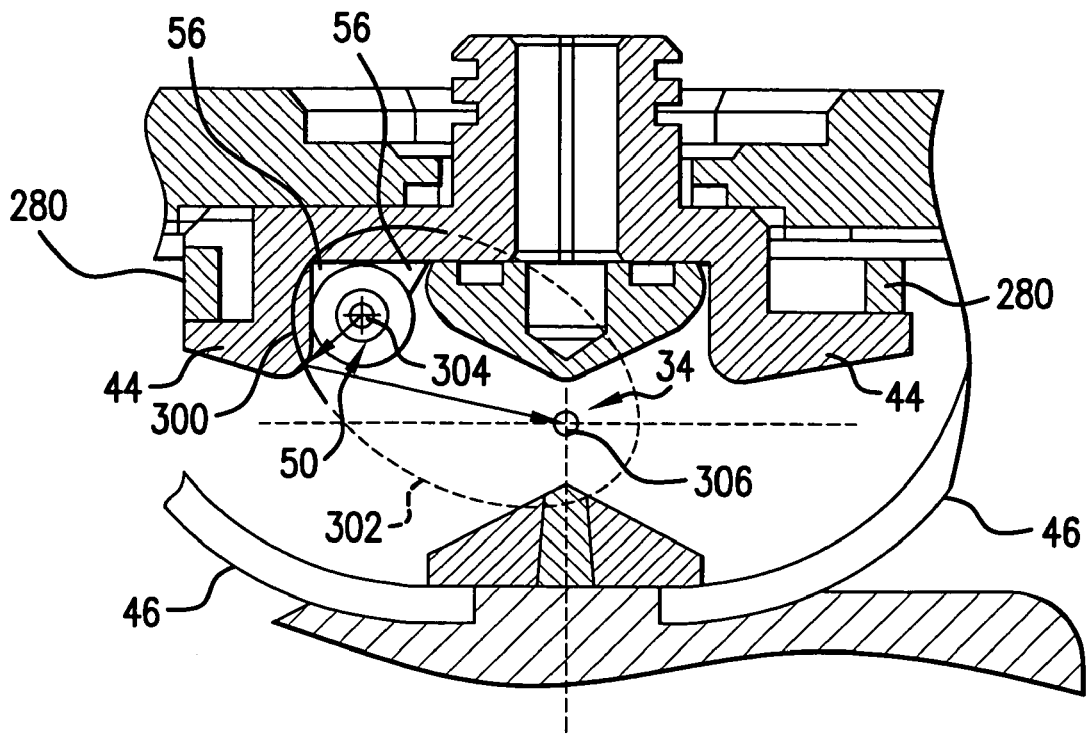

Also shown in FIG. 7 are additional embodiments of debris traps placed in low gas flow regions, e.g., traps 280, forming trap pockets 282, e.g., in pockets formed between, e.g., the main insulator 42 and the top half 22 of the chamber (also shown in FIGS. 11 and 12). In this embodiment the dust traps 280 could be, e.g., generally u-shaped honeycombed structures that can fit, e.g., between the main 42 insulator wings as shown in the Figures general along most or all of the longitudinal extension of the main insulator 42 along the longitudinal axis of the discharge region 34 within the chamber interior 26. Gas pressure and circulation will tend to move debris toward the structures 280 and once the debris passes through the honeycombed openings, e.g., into the pockets 282 it will be difficult for the debris to be caused to return back through the honeycombed structures 280 to return into the gas flow.

Turning now to FIGS. 8-8B there is shown, partially cutaway, a preionizer ground rod 54 according to aspects of an embodiment of the present invention, which may have, e.g., a ground rod elongated thick section 180 and a ground rod thin section 182 on either end of the thick section 180, which is, e.g., for arc prevention reasons as is known in the art. The ground rod may have, e.g., a terminus section 210, which may serve, e.g., as a connecting pin, which may be, e.g., inserted into a ground rod mounting fitting, e.g., in the respective chamber wall and held in place, e.g., by a set screw (not shown). One end of the ground rod 54 may have a mounting flange 214. At least one longitudinal flexure member 216 (two are illustrated in FIG. 8) may be placed at a terminus of the ground rod 54, shaped and sized to fit within the interior of the preionizer ceramic tube 52 (shown, e.g., in FIGS. 7A and B. The flexure member 216 may comprise, e.g., a plurality of slots 218, also illustrated in FIG. 8A and the cross-section of FIG. 8B along the cross-section lines 8B-8B in FIG. 8A. The slots 218 serve to form an accordion-like structure that will compress under compressive stress to the ground rod 54, e.g., due to thermal stressing of the ground rod 54 or other causes, without also inducing, e.g., bending torque in the ground rod 54, which applicants have found to cause catastrophic preionizer tube failures.

Figure 9:
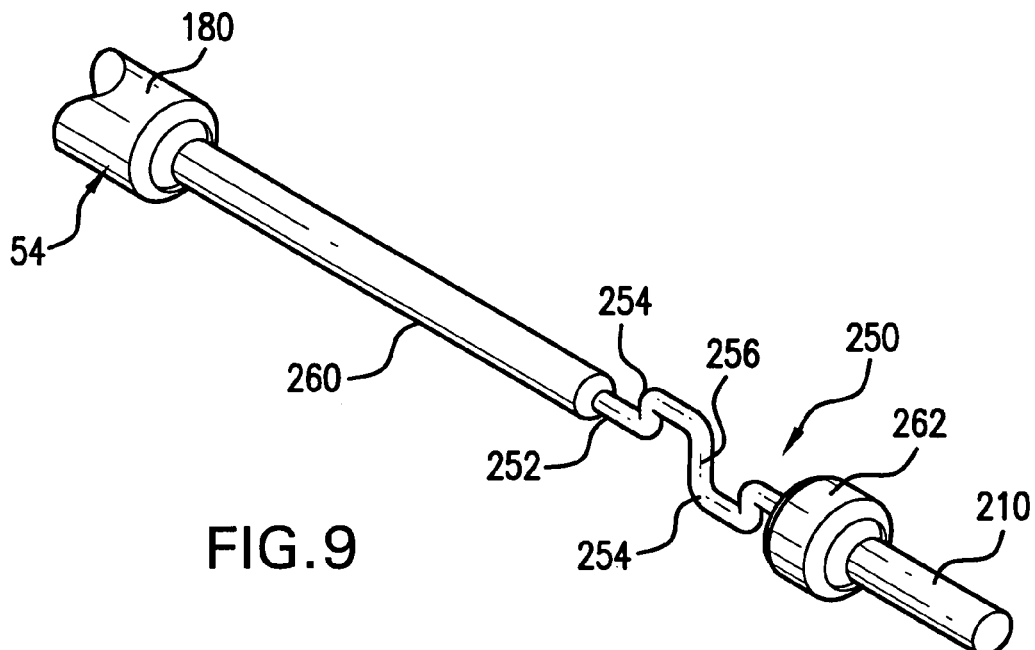
Figure 10:
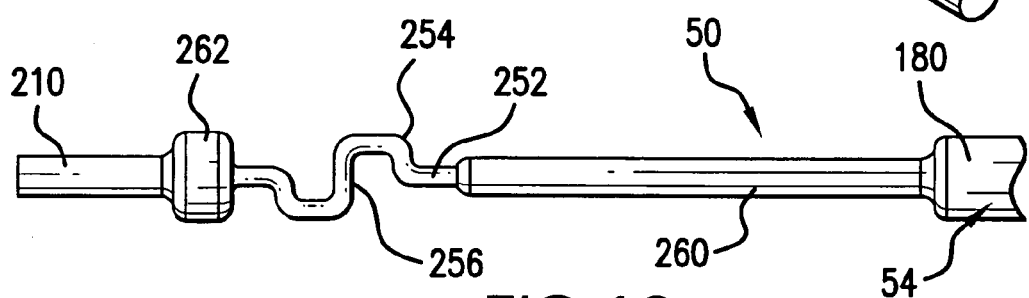

Turning to FIGS. 9 and 10 there is shown an alternative embodiment for a ground rod 54 similar to that shown in FIGS. 8-8B, according to aspects of an embodiment of the present invention in which at least one of the thin sections 260 of the ground rod 54 may, e.g., be formed into a relatively flexible and elastic member 250 that is sized to also fit within the preionizer tube 52. The flexible member 250 may include, e.g., a plurality of longitudinally extending portions 252, laterally extending portions 256 and elbow joints 254. It will be understood that this member 250 may be formed by machining the thinned section 260 of the ground rod 54 to a still smaller thickness diameter and bending the still narrowed portion of thinned section 250 to form the s-shaped bends of the elastic member 250. This flexible section will also allow for compression in the longitudinal direction without inducing bending moment into the ground rod 52.

Turning now to FIG. 11 there is shown a preionization control system 290 according to aspects of an embodiment of the present invention, which may comprise, e.g., a preionization cut-off circuit comprising, e.g., an RC network of resistor 292, which may be, e.g., a [_____] Ω resistor and a capacitor 294, which may be, e.g., a [_____] F capacitor. Applicants have determined that a certain level of preionization in the operation of gas discharge lasers of the type described above in a burst mode is necessary during the first few pulses in the burst, but that, if maintained at that level during the rest of the burst, actually may be detrimental to proper laser light source operation, e.g., detrimental to producing DUV light as desired, after a first number of pulses in the burst, e.g., [_____] pulses. Therefore, the RC network of the preionizer controller 290 may be timed to charge capacitor 294, which may be connected in parallel with resistor 292 between the preionizer ground rod 54 at 296 and ground, i.e., the potential of the anode 32. The connection of the ground rod 54 to the potential of the anode may be done, e.g., by insulating the ground rod 54 from connection to the chamber body, e.g., chamber top half 22, with which it is normally in electrical contact in current lasers sold by applicants' assignee and inserting the RC network 290 between the ground rod 54 and the anode 32.

It will be understood that in operation the ground rod 54 at first will be connected to ground through the resistor 292. However, over time as the cathode 30 is successively brought to high voltage for successive pulses in the burst, the capacitor 294 will charge according to the selected time constant of the RC network 290, until at some point in the burst the potential difference between the capacitor 294 and the cathode 30 will be such that the potential difference between the cathode 30 and the ground rod 54 of the preionizer 50 cannot generate a corona discharge any longer during that burst. Between bursts the resistor 292 can be selected to be of such a value that all or substantially al of the charge on the capacitor 294 bleeds to ground and the ground rod 54 is effectively connected to ground awaiting the next burst.

It will also be understood that, while only one preionization tube 50 is illustrated in FIG. 11, for simplicity, two such preionization tubes 50 may be used, with, e.g., only one having the preionization control circuit 290 just described and the other being connected, e.g., directly to ground. Therefore, in operation, e.g., this preionizer will continue to act as a preionizer all through the burst. In this fashion, e.g., preionization can be made, e.g., to be at a high electron density, and e.g., on both sides of the discharge, early in a burst, e.g., for the first [_____] number of pulses and at a lower electron density during the remainder of the pulses in the burst.

Figure 13:
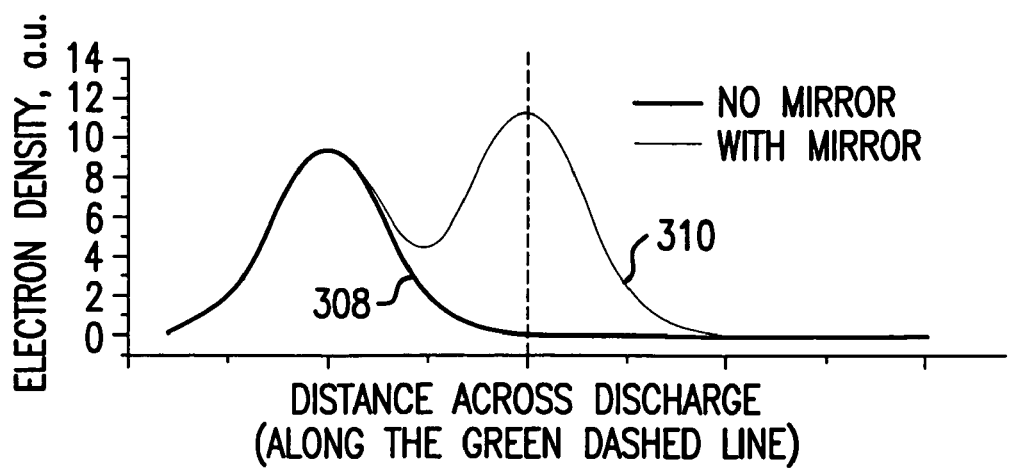

Turning now to FIG. 12 there is shown an improved preionizer 50 according to an aspect of an embodiment of the present invention. The improved preionizer 50 may incorporate, e.g., a mirror 300 which may be, e.g., a section of a cylindrical ellipse 302, having, e.g., a first focus at the centerline longitudinal axis of the preionizer 50, e.g., the centerline longitudinal axis of the ground rod 54 of the preionizer 50 and a second focus in a desired portion of the gas discharge region 34 between the electrodes 30, 32. this selected portion may be, e.g., along the longitudinal centerline axis of the gas discharge, and, e.g., at a selected position between the electrode 30, 32, i.e., vertically displaced (as that direction is illustrated in FIG. 12) within the discharge region 34, e.g., mid-way between cathode 30 and anode 32. In this manner, as illustrated by example in FIG. 13, the density distribution of electrons from the preionization can be shifted more into the center of the gas discharge region, e.g., enhancing the effectiveness of the preionization. The mirror 300 may be formed as a part of, e.g., the main insulator 44, e.g., by grinding and polishing out the elliptical surface and may be reflective due to a highly polished surface or by the addition of a suitable coating, e.g., [_____].

Currently a manner of effecting preionization in gas discharge lasers is to utilize the preionizer as essentially a capacitive element, e.g., with the dielectric of the preionization tube 52 acting as the dielectric in a capacitor formed, e.g., between the cathode 30 and the ground rod 54. As a high voltage, e.g., a high negative voltage, is applied to the cathode 30 at some point the differential in voltage between the cathode 30 and anode 32 causes an electrical discharge between the two as the gas medium becomes conductive. The preionizer tube is selected in radial dimension and shape to initiate a corona discharge on the surface of the preionization tube 52 at a time just shortly before the peak anode to cathode voltage is reached to seed the gas medium with electrons to help initiate and speed up the formation of the electrical discharge between the electrodes 30, 32.

In some circumstances of operation, however, e.g., in a molecular fluorine laser and/or one operating a reduced high voltage, the initiation and/or duration of the electrical discharge may tend to hang up more than normal before the actual discharge occurs and the high voltage begins ringing between the electrodes 30,32. Thus, e.g., the preionization effect may be mis-timed enough to interfere with the timing and adequacy of preionization.

Applicants believe that a solution to this problem can be found in putting a switch on the ground rod 54, e.g., to more actively control preionization by controlling when the ground rod 54 is at common potential and thus can cause the corona discharge due to a difference in potential between the cathode 30 and the ground rod 54. This switch could be, e.g., in one embodiment, a saturable magnetic switch (not shown), such that variations in the voltage applied to the cathode and to the switch could provide a suitable preionization at, e.g., 20-40 ns before the actual occurrence of the discharge, based on a volt-second product that changes this delay time appropriately according to voltage applied, i.e., for a lower voltage a longer delay in switch closure and vise-versa for higher voltage. Alternatively, a non-active inductive element (not shown), e.g., a [_____] could be employed, perhaps at the expense of some amplitude of the displacement current (corona discharge) of the preionizer, or alternatively a surface flashover ceramic connector (not shown) could be utilized, e.g., connecting the ground rod 54 to ground to delay the onset of preionization as appropriate. Although this is not as active a control of preionization onset as the use of, e.g., a switch, it still may be effective.

Figure 14:
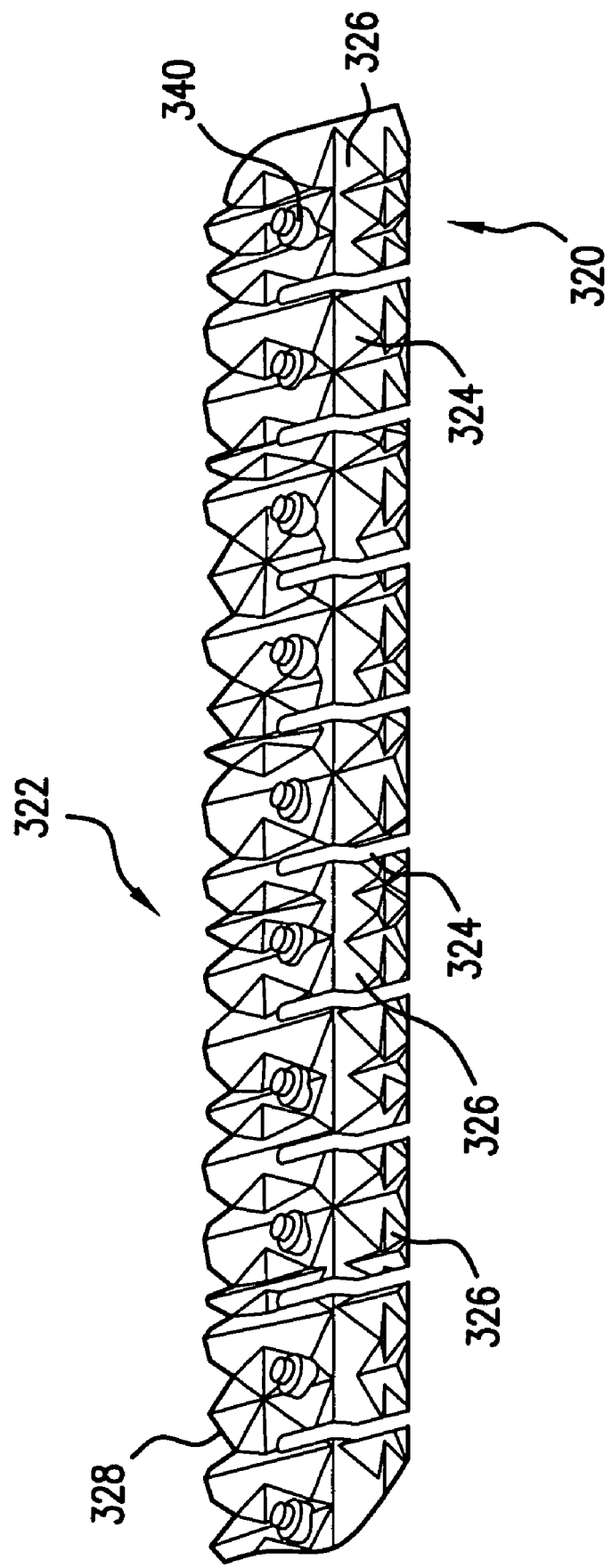
FIG. 14 shows a baffle plate according to aspects of an embodiment of the present invention; and, FIG. 15 shows aspects of an embodiment of the present invention relating to improved preionization.

Turning now to FIG. 14 there is shown a baffle plate 320 according to an aspect of an embodiment of the present invention. The baffle plate may have a base plate 322, along with, e.g., a plurality of generally pyramidal structures, e.g., pyramidal structure 324, pyramidal structure 326, and pyramidal structure 328, which may differ in the size of the generally pyramid shaped elements within each structure 324, 326, 328 and the number of pyramidal elements in each structure 324, 326, 328. The structures such as 324 and 326 may differ from, e.g., structures 328 by, e.g., the orientation of major ridges formed, i.e., from longitudinally extending to transversely extending. The baffle plate 320 may be attached in the chamber 26, e.g. to a chamber wall, e.g., wall 29, e.g., by bolts passing through bolt holes 340.

Acoustic effects within the chamber 26 may also be attenuated or removed by, e.g., introducing artificial jitter into the timing of the laser discharge, so that the inter-pulse period varies, e.g., from one pulse to another within, e.g., a burst of pulses, e.g., randomly or with a repeatable pattern, e.g., within the given burst. Variations in the discharge timing so produced, e.g., on the order of 1/width of a resonance peak can, e.g., break up the periodicity and reduce the growth rate of resonance leading to the formation of resonance peaks, e.g., in the output bandwidth of the laser system. By way of example, for the case of a typical, e.g., 20 Hz wide resonance peak, e.g., at about 3000 Hz laser pulse repetition rate, e.g., a few microsecond artificial jitter can, e.g., correlate acoustic disturbances sufficiently. Instead of a truly random pattern, the pattern of jitter error introduced into the trigger delay can be made to repeat, e.g., every Nslit pulses, where Nslit is the number of pulsed in the exposure slit. This insures, e.g., that the number of pulses seen by the resist at any point in the slit remains the same regardless of jitter magnitude and stage speed. For a MOPA arrangement the jitter would need to be introduced in, e.g., the MOPA firing, with the firing of the PA based on the actual time of the jittered firing of the MO. This may be done, e.g., using existing firing control panels on lasers sold by applicant's assignee, e.g., 7000 series lasers, to manipulate, e.g., trigger-in to discharge timing.

Figure 15:
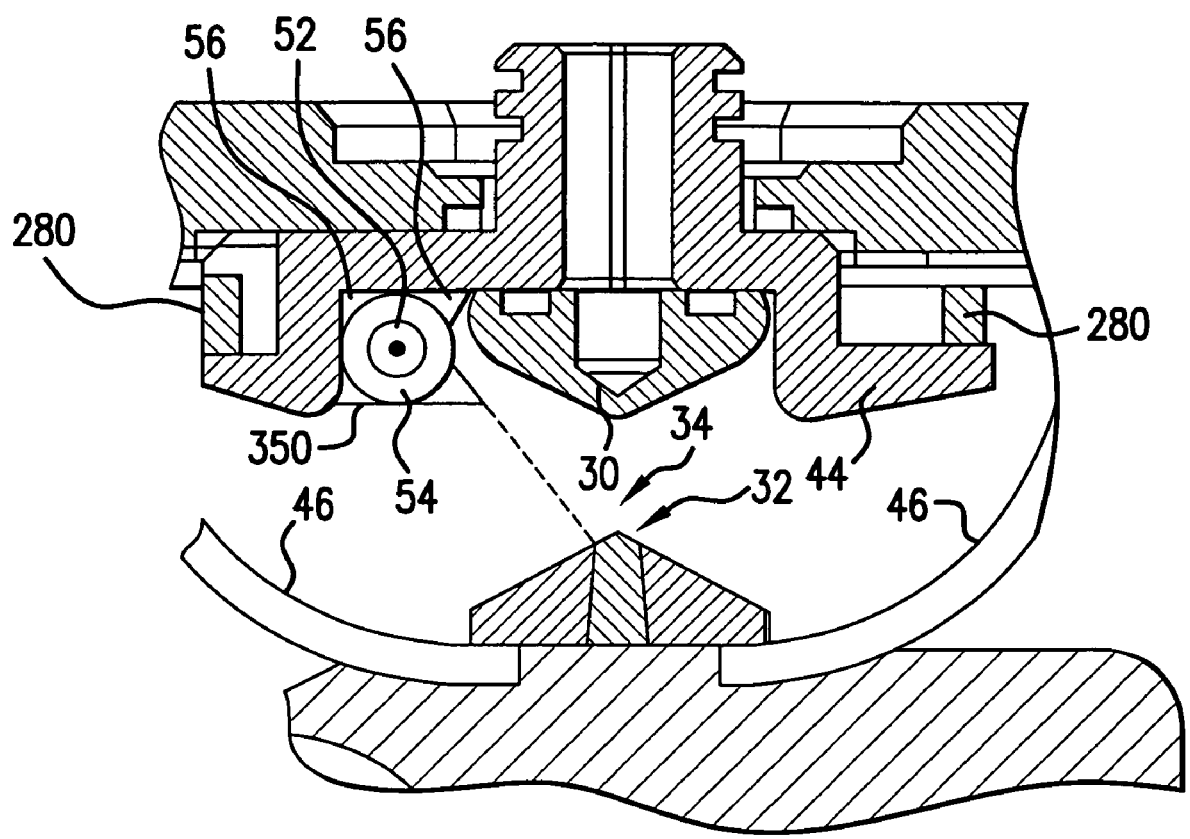

Turning now to FIG. 15 there is shown aspects of an embodiment of the present invention relating to improvements in preionization. Based on experimental inventigation applicants have developed an improved understanding of factors relating to preionization efficiencies and effectiveness. With regard to, e.g., upstream preionization after an initial preionization, e.g., on the first pulse of a series of pulses, e.g., a burst of pulses applicants have noted that there occurs a period of decreased energy efficiency in the discharge for subsequent pulses, apparently, e.g., until gases that have been ionized in, e.g., the first preionization and first main discharge, have been recirculated back through the chamber, e.g., past the heat exchangers and back through the blower (fan). Applicants believe that this is due to the depletion of ionizable species in and around the discharge region after the first pulse in the burst, and applicants investigated this belief and proposed a solution to the energy stability degradation over the burst time that involves keeping the gas upstream of the discharge region from being depleted during preionization. Applicants, therefore have inserted, e.g., a protective cover 350 over the preionization tube 54. The protective cover 350, which may be an extension of the conductive shim 56, or a metallic coating (not shown) may serve, e.g., to prevent the corona discharge from forming on the preionization tube 54 in the region of the extension 350 of the shim 36(or the metallic coating) and, therefore, the substantial prevention of the occurrence of the ionization of gas specie upstream of the discharge region prior to gas discharge in the gas discharge region by masking this area from the corona discharge on the preionization tube 54. As shown in FIG. 15 the mask formed by the extension 350 of the shim 56 (or the corresponding metallic coating, not shown) may extend substantially all of the way around the preionization tube 54, except in the region of corona discharge access to the discharge region to, e.g., substantially extinguish the corona discharge in areas of the preionization tube that do not fact the electrodes 30, 32.

As can be seen from FIG. 15, the mask 390 (or corresponding metallic coating, not shown), together with, e.g., the rest of the shim 56 may serve to focus the production of ions from the corona discharge generated by the unexposed remaining portions of, e.g., the preionization tube 54 toward the discharge region 34, indicated schematically by the dashed lines extending from the mask 350 to the anode bar 32. It will be understood that according to aspects of an embodiment of the present invention this mask 390 can be used with other forms of preionization besides simply corona discharge, e.g., with spark gap preioniation and/or preionization through a slotted opening in a preionization tube.

It will be understood by those skilled in the art that many modification and changes can be made to the aspects of embodiments of the present invention disclosed in this specification without departing from the scope and spirit of the inventions embodied in the aspects of embodiments of the present invention disclosed in this application. Therefore, the appended claims should not be interpreted to be limited to or narrowed in scope in any way by the specifics of aspects of embodiments described herein.

We claim:

1. A high power high repetition rate gas discharge laser UV light source comprising:
    a gas discharge chamber comprising an interior wall comprising a vertical wall and an adjacent bottom wall;
    a gas circulation fan creating a gas flow path adjacent the interior vertical wall and the adjacent bottom wall;
    an in-chamber dust trap positioned in a region of low gas flow.

2. The apparatus of claim 1 further comprising:
    the dust trap is positioned along an interior wall.

3. The apparatus of claim 1 further comprising:
    the dust trap comprises at least one meshed screen.

4. The apparatus of claim 2 further comprising:
    the dust trap comprises at least one meshed screen.

5. The apparatus of claim 1 further comprising:
    the dust trap comprises a plurality of meshed screens.

6. The apparatus of claim 2 further comprising:
    the dust trap comprises a plurality of meshed screens.

7. The apparatus of claim 3 further comprising:
    the dust trap comprises a plurality of meshed screens.

8. The apparatus of claim 4 further comprising:
    the dust trap comprises a plurality of meshed screens.

9. The apparatus of claim 1 further comprising:
    the dust trap comprises at least two different gauge meshed screens.

10. The apparatus of claim 2 further comprising:
    the dust trap comprises at least two different gauge meshed screens.

11. The apparatus of claim 3 further comprising:
    the dust trap comprises at least two different gauge meshed screens.

12. The apparatus of claim 4 further comprising:
    the dust trap comprises at least two different gauge meshed screens.

13. The apparatus of claim 5 further comprising:
    the dust trap comprises at least two different gauge meshed screens.

14. The apparatus of claim 6 further comprising:
    the dust trap comprises at least two different gauge meshed screens.

15. The apparatus of claim 7 further comprising:
    the dust trap comprises at least two different gauge meshed screens.

16. The apparatus of claim 8 further comprising:
    the dust trap comprises at least two different gauge meshed screens.

17. The apparatus of claim 1 further comprising:
    the dust trap extends along the bottom interior wall of the chamber.

18. The apparatus of claim 2 further comprising:
    the dust trap extends along the bottom interior wall of the chamber.

19. The apparatus of claim 3 further comprising:
    the dust trap extends along the bottom interior wall of the chamber.

20. The apparatus of claim 4 further comprising:
    the dust trap extends along the bottom interior wall of the chamber.

21. The apparatus of claim 5 further comprising:
    the dust trap extends along the bottom interior wall of the chamber.

22. The apparatus of claim 6 further comprising:
    the dust trap extends along the bottom interior wall of the chamber.

23. The apparatus of claim 7 further comprising:
    the dust trap extends along the bottom interior wall of the chamber.

24. The apparatus of claim 8 further comprising:
    the dust trap extends along the bottom interior wall of the chamber.

25. The apparatus of claim 9 further comprising:
    the dust trap extends along the bottom interior wall of the chamber.

26. The apparatus of claim 10 further comprising:
    the dust trap extends along the bottom interior wall of the chamber.

27. The apparatus of claim 11 further comprising:
    the dust trap extends along the bottom interior wall of the chamber.

28. The apparatus of claim 12 further comprising:
    the dust trap extends along the bottom anterior wall of the chamber.

29. The apparatus of claim 13 further comprising:
    the dust trap extends along the bottom interior wall of the chamber.

30. The apparatus of claim 14 further comprising:
    the dust trap extends along the bottom interior wall of the chamber.

31. The apparatus of claim 15 further comprising:
    the dust trap extends along the bottom interior wall of the chamber.

32. The apparatus of claim 16 further comprising:
the dust tap extends along the bottom interior wall of the chamber.
33. The apparatus of claim 17 further comprising:
the dust trap extends along a vertical portion of the interior wall.
34. The apparatus of claim 18 further comprising:
the dust trap extends along a vertical portion of the interior wall.
35. The apparatus of claim 19 further comprising:
the dust trap extends along a vertical portion of the interior wall.
36. The apparatus of claim 20 further comprising:
the dust trap extends along a vertical portion of the interior wall.
37. The apparatus of claim 21 further comprising:
the dust trap extends along a vertical portion of the interior wall.
38. The apparatus of claim 22 further comprising:
the dust trap extends along a vertical portion of the interior wall.
39. The apparatus of claim 23 further comprising:
the dust trap extends along a vertical portion of the interior wall.
40. The apparatus of claim 24 further comprising:
the dust trap extends along a vertical portion of the interior wall.
41. The apparatus of claim 25 further comprising:
the dust trap extends along a vertical portion of the interior wall.
42. The apparatus of claim 26 further comprising:
the dust trap extends along a vertical portion of the interior wall.
43. The apparatus of claim 27 further comprising:
the dust trap extends along a vertical portion of the interior wall.
44. The apparatus of claim 28 further comprising:
the dust trap extends along a vertical portion of the interior wall.
45. The apparatus of claim 29 further comprising:
the dust trap extends along a vertical portion of the interior wall.
46. The apparatus of claim 30 further comprising:
the dust trap extends along a vertical portion of the interior wall.
47. The apparatus of claim 31 further comprising:
the dust trap extends along a vertical portion of the interior wall.
48. The apparatus of claim 32 further comprising:
the dust trap extends along a vertical portion of the interior wall.
49. The apparatus of claim 1 further comprising:
the dust trap comprises:
a first meshed screen having a first gauge;
a second meshed screen having a second gauge smaller than the first gange;
the second meshed screen intermediate the first meshed screen and the interior wall.
50. The apparatus of claim 2 further comprising:
the dust trap comprises:
a first meshed screen having a first gauge;
a second meshed screen having a second gauge smaller than the first gauge;
the second meshed screen intermediate the first meshed screen and the interior wall.
51. The apparatus of claim 3 further comprising:
the dust trap comprises:
a first meshed screen having a first gauge;
a second meshed screen having a second gauge smaller than the first gauge;
the second meshed screen intermediate the first meshed screen and the interior wall.
52. The apparatus of claim 4 further comprising:
the dust trap comprises:
a first meshed screen having a first gauge;
a second meshed screen having a second gauge smaller than the first gauge;
the second meshed screen intermediate the first meshed screen and the interior wall.
53. The apparatus of claim 5 further comprising:
the dust trap comprises:
a first meshed screen having a first gauge;
a second meshed screen having a second gauge smaller than the first gauge;
the second meshed screen intermediate the first meshed screen and the interior wall.
54. The apparatus of claim 6 further comprising:
the dust trap comprises:
a first meshed screen having a first gauge;
a second meshed screen having a second gauge smaller than the first gauge;
the second meshed screen intermediate the first meshed screen and the interior wall.
55. The apparatus of claim 7 further comprising:
the dust trap comprises:
a first meshed screen having a first gauge;
a second meshed screen having a second gauge smaller than the first gauge;
the second meshed screen intermediate the first meshed screen and the interior wall.
56. The apparatus of claim 8 further comprising:
the dust trap comprises:
a first meshed screen having a first gauge;
a second meshed screen having a second gauge smaller than the first gauge;
the second meshed screen intermediate the first meshed screen and the interior wall.
57. The apparatus of claim 9 further comprising:
the dust trap comprises:
a first meshed screen having a first gauge;
a second meshed screen having a second gauge smaller than the first gauge;
the second meshed screen intermediate the first meshed screen and the interior wall.
58. The apparatus of claim 10 further comprising:
the dust trap comprises:
a first meshed screen having a first gauge;
a second meshed screen having a second gauge smaller than the first gauge;
the second meshed screen intermediate the first meshed screen and the interior wall.
59. The apparatus of claim 11 further comprising:
the dust trap comprises:
a first meshed screen having a first gauge;
a second meshed screen having a second gauge smaller than the first gauge;
the second meshed screen intermediate the first meshed screen and the interior wall.
60. The apparatus of claim 12 further comprising:
the dust trap comprises:
a first meshed screen having a first gauge;

a second meshed screen having a second gauge smaller than the first gauge;

the second meshed screen intermediate the first meshed screen and the interior wall.

61. The apparatus of claim 13 further comprising:

the dust trap comprises:

a first meshed screen having a first gauge;

a second meshed screen having a second gauge smaller than the first gauge;

the second meshed screen intermediate the first meshed screen and the interior wall.

62. The apparatus of claim 14 further comprising:

the dust trap comprises:

a first meshed screen having a first gauge;

a second meshed screen having a second gauge smaller than the first gauge;

the second meshed screen intermediate the first meshed screen and the interior wall.

63. The apparatus of claim 15 further comprising:

the dust trap comprises:

a first meshed screen having a first gauge;

a second meshed screen having a second gauge smaller than the first gauge;

the second meshed screen intermediate the first meshed screen and the interior wall.

64. The apparatus of claim 16 further comprising:

the dust trap comprises:

a first meshed screen having a first gauge;

a second meshed screen having a second gauge smaller than the first gauge;

the second meshed screen intermediate the first meshed screen and the interior wall.

* * * * *